(12) United States Patent
Yasuda

(10) Patent No.: US 6,516,082 B1
(45) Date of Patent: *Feb. 4, 2003

(54) RADIATION IMAGE PROCESSING METHOD AND APPARATUS

(75) Inventor: Hiroaki Yasuda, Kanagawa-ken (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,036
(22) Filed: Sep. 10, 1997

(30) Foreign Application Priority Data

Sep. 10, 1996 (JP) .............................................. 8-238698

(51) Int. Cl.[7] ................................................. G06K 9/00
(52) U.S. Cl. ....................................... 382/132; 378/901
(58) Field of Search ................................. 382/132, 128; 250/580, 581, 582, 583, 584, 585, 587, 588; 378/901; 358/456, 298

(56) References Cited

U.S. PATENT DOCUMENTS

| | | | | |
|---|---|---|---|---|
| 4,969,049 A | * | 11/1990 | Mitani et al. | 358/296 |
| 5,073,961 A | * | 12/1991 | Takeo | 382/132 |
| 5,651,362 A | * | 7/1997 | Shigyo et al. | 250/580 |
| 5,684,888 A | * | 11/1997 | Vuylsteke | 382/132 |

* cited by examiner

Primary Examiner—Jingge Wu
(74) Attorney, Agent, or Firm—Sughrue Mion, PLLC

(57) ABSTRACT

Image processing, which is constituted of a plurality of processes, is carried out on a radiation image signal. An intermediate image signal obtained in at least one process, which is among the processes other than a last process in the plurality of the processes constituting the image processing, is stored on a predetermined storage medium. In cases where an abnormality occurred during the image processing, a process, in which the abnormality occurred, is discriminated quickly, and a cause of the abnormality is specified quickly.

7 Claims, 2 Drawing Sheets

F I G.1
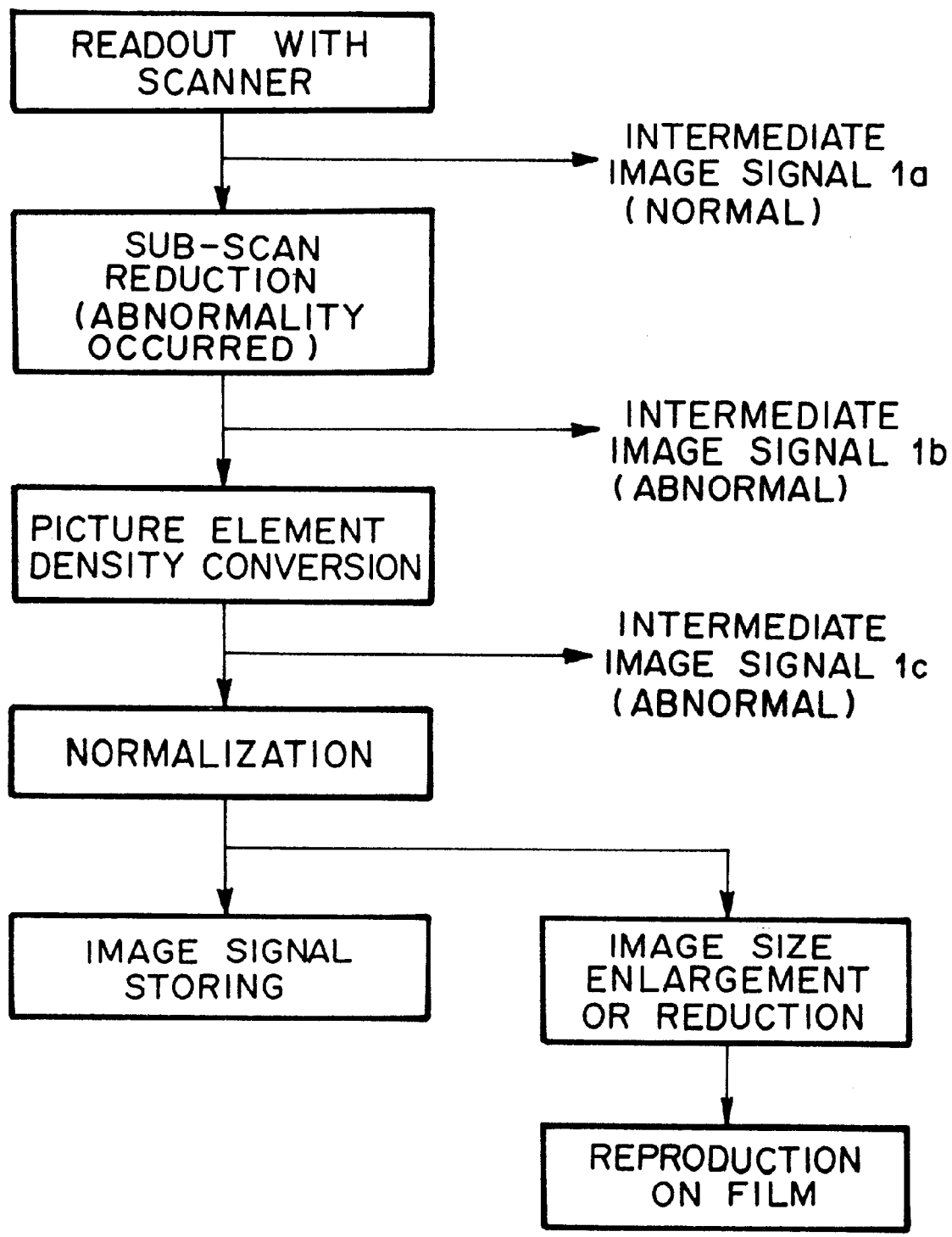

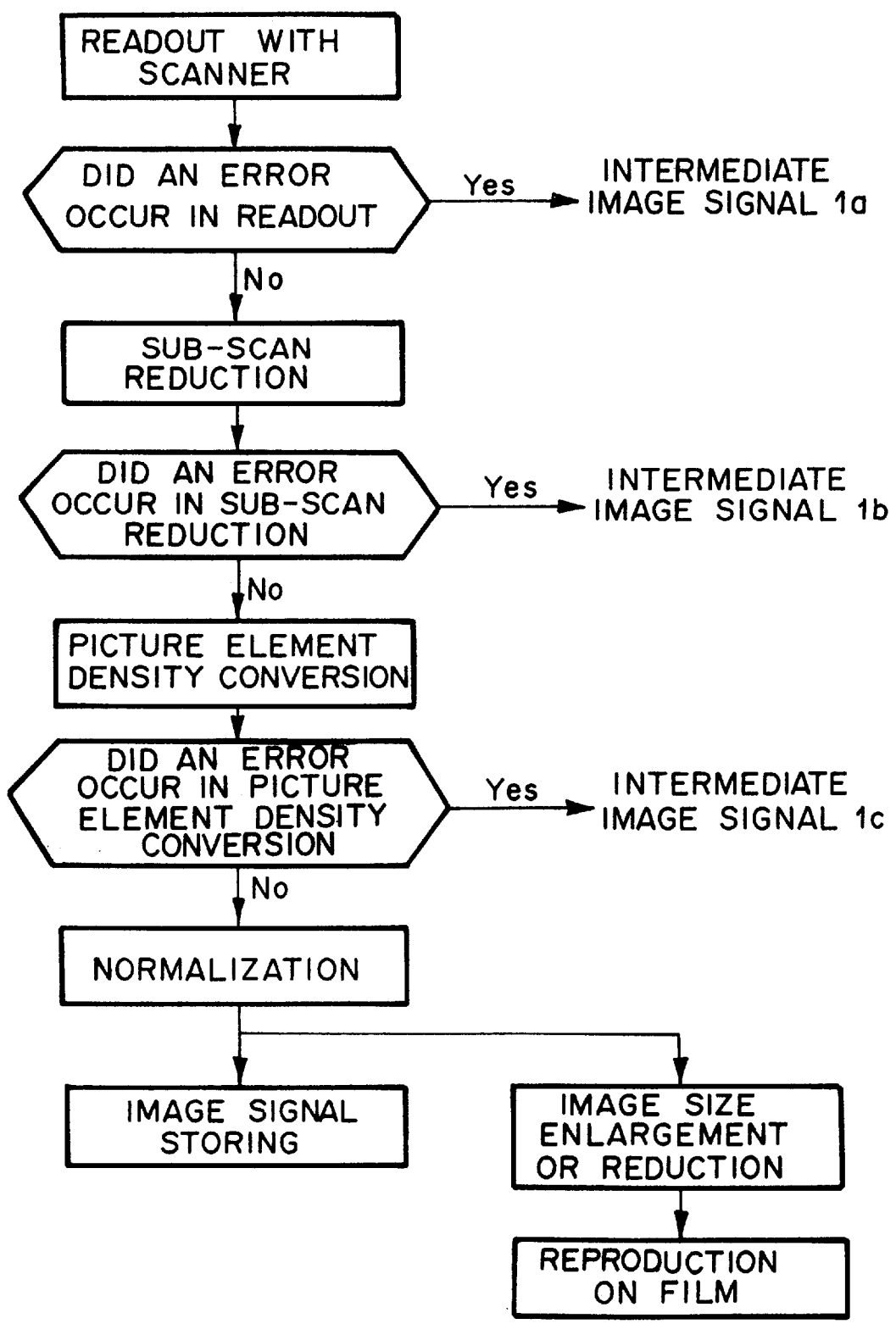
F I G. 2

RADIATION IMAGE PROCESSING METHOD AND APPARATUS

BACKGROUND OF THE INVENTION

1. Field of the Invention

This invention relates to a radiation image processing method and apparatus. This invention particularly relates to specifying of a portion, at which an abnormality occurs, and a cause of the abnormality in cases where the abnormality occurred during image processing.

2. Description of the Prior Art

Image processing techniques have heretofore been used, in which a radiation image having been recorded on photographic film is photoelectrically read out, an image signal representing the radiation image being thereby obtained, appropriate image processing is carried out on the image signal, and then a visible image is reproduced from the processed image signal. Also, radiation image processing systems, in which stimulable phosphors are utilized, have heretofore been used. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then subjected to appropriate image processing and used for the reproduction of the radiation image of the object as a visible image on a recording material, such as photographic material, or on a display device, such as a cathode ray tube (CRT) display device. Such a radiation image processing system is disclosed in, for example, U.S. Pat. No. 4,258,264.

In the radiation image processing systems, various kinds of image processing are carried out such that a visible image suitable for use in making a diagnosis of an illness, or the like, can be obtained ultimately on photographic film, a CRT display device, or the like.

In general, in cases where image processing is carried out, it often occurs that an inappropriate visible image is obtained due to erroneous operations of image processing apparatuses, erroneous setting of image processing parameters, or the like. In such cases, ordinarily, the operator of the image processing apparatus investigates which step of the image processing was abnormal and why the abnormality occurred. The operator then eliminates the cause of the abnormality and again carries out the image processing.

In an image processing apparatus in which only one kind of simple image processing is carried out, it will not be very difficult to specify a portion, at which the abnormality occurred, or a cause of the abnormality. Also, in cases where complicated image processing is carried out, if the number of operations or settings carried out by the operator is small, a portion, at which an abnormality occurred, and a cause of the abnormality, can be specified by making reference to the operations or the settings. However, in cases where many kinds of image processing are carried out in accordance with many steps of operations or many setting parameters as in the aforesaid radiation image processing systems, it is difficult to ascertain a portion, at which the abnormality, occurred, and a cause of the abnormality by merely seeing an inappropriate visible image, which is Age obtained ultimately. Therefore, in the past, considerable time and labor were required to specify a portion, at which the abnormality occurred, or a cause of the abnormality by, for example, again carrying out a plurality of processes of the image processing one after another.

SUMMARY OF THE INVENTION

The primary object of the present invention is to provide a radiation image processing method wherein, in cases where an abnormality occurred during image processing carried out on a radiation image, a process, in which the abnormality occurred, is capable of being discriminated quickly, and a cause of the abnormality is capable of being specified quickly.

Another object of the present invention is to provide an apparatus for carrying out the radiation image processing method.

The present invention provides a first radiation image processing method for carrying out image processing, which is constituted of a plurality of processes, on a radiation image signal, wherein an intermediate image signal obtained in at least one process is stored, which is among the processes other than a last process in the plurality of the processes constituting the image processing, the intermediate image signal being stored on a predetermined storage medium.

In the first radiation image processing method in accordance with the present invention, the storing of the intermediate image signal on the storage medium should preferably be carried out by repeating overwriting on a predetermined storage area of the storage medium. Also, the overwriting on the predetermined storage area should preferably be ceased and an intermediate image signal, which has been stored in the storage area, should preferably be retained in accordance with an instruction, which is given by an operator, or a signal, which represents the occurrence of abnormality in a preceding process.

The present invention also provides a second radiation image processing method for carrying out image processing, which is constituted of a plurality of processes, on a radiation image signal, wherein an intermediate image signal having been obtained in a process is stored, which is among the plurality of the processes constituting the image processing and in which an abnormality occurred, the intermediate image signal being stored on a predetermined storage medium.

The present invention further provides an apparatus for carrying out processing in accordance with the aforesaid first radiation image processing method. Specifically, the present invention further provides a first radiation image processing apparatus, comprising:

i) a plurality of image processing means for successively carrying out different kinds of image processing on a radiation image signal, and ii) a storage means for storing an intermediate image signal obtained from at least one image processing means, which is among the plurality of the image processing means and carries out image processing other than last image processing.

In the first radiation image processing apparatus in accordance with the present invention, the storage means should preferably store the intermediate image signal by repeating overwriting on a predetermined storage area. Also, the storage means should preferably cease the overwriting on the predetermined storage area and should preferably retain an intermediate image signal, which has been stored in the storage area, in accordance with an instruction, which is given by an operator, or a signal, which represents the occurrence of an abnormality in a preceding process.

The present invention still further provides a second radiation image processing apparatus, comprising:

i) a plurality of image processing means for successively carrying out different kinds of image processing on a radiation image signal, and ii) a storage means for storing an intermediate image signal having been obtained from an image processing means, which is among the plurality of the image processing means and in which the abnormality occurred.

The term "last process" or the term "last image processing" as used herein means the process or the image processing such that an image signal obtained at the time, at which the process or the image processing is finished, may serve as the image signal fed out from the radiation image processing apparatus.

Also, the term "intermediate image signal obtained (or having been obtained) in a process" or the term "intermediate image signal obtained (or having been obtained) from image processing means" as used herein means the image signal, which is obtained when the processing to be carried out in the process or the image processing means has been carried out, and the image signal, which is formed when the processing to be carried out in the process or the image processing means has been interrupted due to some cause. The term "intermediate image signal obtained (or having been obtained) in a process" or the term "intermediate image signal obtained (or having been obtained) from image processing means" as used herein further means the image signal, which occurs when, even though the image signal has passed through the process or the image processing means, no processing has been carried out on the image signal, and the same image signal as that at the beginning of the process (or the same image signal as that having been fed into the image processing means) is obtained.

Further, the term "predetermined storage medium" as used herein means a storage device, such as a hard disk or a memory. In the radiation image processing method and apparatus in accordance with the present invention, as described above, the storing of the intermediate image signal on the storage medium may be carried out by repeating overwriting on a predetermined storage area. Specifically, a storage area for a single image signal may be prepared, and the intermediate image signal may always be written into the storage area when the intermediate image signal is to be stored. Alternatively, for example, a storage area for a single image signal may be prepared for each of the processes, and the storage areas for the respective processes may be used such that, as for one radiation image, all of the obtained intermediate image signals may remain unerased without the overwriting being carried out, and such that, when the next radiation image is processed, new intermediate image signals are overwritten upon the previously stored intermediate image signals. Specifically, the term "repeating overwriting on a predetermined storage area" as used herein does not necessarily mean that the overwriting is carried out each time an intermediate image signal is stored, and means that a certain limited storage area is subjected to the overwriting and is used repeatedly.

In the radiation image processing method and apparatus in accordance with the present invention, as described above, in accordance with an instruction given by an operator or a signal representing the occurrence of abnormality in a preceding process, the overwriting on the predetermined storage area may be ceased, and an intermediate image signal, which has been stored in the storage area, may be retained. For such purposes, for example, the processing may be interrupted immediately such that the overwriting may not be carried out. Alternatively, immediately before the overwriting is begun, the processing may be interrupted temporarily, and the intermediate image signal, which has been stored in the storage area, may be saved to a different area. As another alternative, the overwriting on the storage area may not be carried out any more, and the next storage and those that follow may be carried out on different storage areas.

The term "process" as used herein means the minimum processing unit, which the designer considers to be necessary when a portion, where an abnormality occurred, is specified. Therefore, even for image processing apparatuses in which the same image processing is carried out, the processes are not necessarily determined uniquely and may be defined in various different ways. For example, in an operation for detecting a radiation image signal from a radiation image, each of the scanning along a main scanning direction and the scanning along a sub-scanning direction may be taken as a single process, and the storing of the intermediate image signal may thereby be carried out. In such cases, when a portion, at which an abnormality occurred, is specified, it can be discriminated whether the abnormality occurred during the scanning along the main scanning direction or during the scanning along the sub-scanning direction. However, in cases where the combination of the scanning along the main scanning direction and the scanning along the sub-scanning direction is taken as a single process, when a portion, at which an abnormality occurred, is specified, it can be found only that the abnormality occurred during the operation for detecting the radiation image signal from the radiation image. Also, the term "image processing means" as used herein does not necessarily correspond to a single set of hardware functions or a single program, and means a conceptional image processing means.

The term "abnormality" as used herein means an error, warning, or the like. When abnormality occurs, the processing may be interrupted. Also, when abnormality occurred, the processing may not be interrupted and may be continued.

With the first radiation image processing method and the first radiation image processing apparatus in accordance with the present invention, wherein image processing, which is constituted of a plurality of processes, is carried out on the radiation image signal, the intermediate image signal obtained in each of the processes is stored. Therefore, the progress of the image processing remains such that it can be watched. In cases where an abnormal output is obtained from the image processing, the intermediate image signal can be investigated, and the specifying of a portion, at which abnormality occurred, and investigation of the cause of the abnormality can thus be carried out quickly.

Also, in cases where the intermediate image signal is stored, a certain limited storage area may be used repeatedly such that an intermediate image signal, which will later become necessary for specifying a portion, where an abnormality occurred, may not be erased by the overwriting, and such that the other unnecessary intermediate image signals may be erased by the overwriting. In this manner, the storage capacity of the storage medium to be used can be kept small.

With the second radiation image processing method and the second radiation image processing apparatus in accordance with the present invention, in cases where a process has been finished normally, the storing of the intermediate image signal is not carried out. Only when an abnormality has occurred or an instruction has been given by the operator, the intermediate image signal is stored. Therefore, the information necessary for specifying a portion, at which the abnormality occurred, and the cause of the abnormality can be kept by using only a small storage capacity of the storage medium.

BRIEF DESCRIPTION OF THE DRAWINGS

FIG. 1 is a flow chart showing the concept behind the first radiation image processing method in accordance with the present invention, and FIG. 2 is a flow chart showing the concept behind the second radiation image processing method in accordance with the present invention.

DESCRIPTION OF THE PREFERRED EMBODIMENTS

The present invention will hereinbelow be described in further detail with reference to the accompanying drawings.

Embodiments described below concern the radiation image processing system disclosed in the publication described above. As for the constitution of the radiation image processing system and the processing carried out in it, reference may be made to the publication described above.

FIG. 1 is a flow chart showing the concept behind the first radiation image processing method in accordance with the present invention. FIG. 2 is a flow chart showing the concept behind the second radiation image processing method in accordance with the present invention. As illustrated in FIGS. 1 and 2, in each radiation image processing system, four kinds of processes, i.e. image readout with a scanner, sub-scanning reduction, picture element density conversion, and normalization, are carried out. Thereafter, a processed radiation image signal, which has been obtained from the normalization, is stored on a predetermined storage medium. Also, when necessary, image size enlargement or reduction is carried out on the processed radiation image signal, and the processed radiation image signal having been obtained from the image size enlargement or reduction is used for reproducing a visible image on photographic film.

However, the kinds of the processes and the classification of the processing into four kinds of processes are not essential to the radiation image processing methods and apparatuses in accordance with the present invention. In the radiation image processing methods and apparatuses in accordance with the present invention, a series of image processing may be classified into at least two processes, such that whether or not a process was carried out normally can be confirmed from a processed image signal, which is obtained in the process. Therefore, in the radiation image processing methods and apparatuses in accordance with the present invention, the processes shown in FIGS. 1 and 2 are not the essential steps and are mere examples taken for the explanation. Also, the classification of the image processing, which is carried out in the radiation image processing system, into the four kinds of the processes described above is a mere example of classification. The radiation image processing methods and apparatuses in accordance with the present invention are also applicable when processing carried out in the radiation image processing system is classified into different processes.

As illustrated in FIG. 1, in the first radiation image processing method and apparatus in accordance with the present invention, an intermediate image signal, which is obtained as a result of processing in each process, is stored on a predetermined storage medium. Specifically, an image signal, which is obtained from the image readout with the scanner, is stored as an intermediate image signal 1a. An image signal, which is obtained from the sub-scanning reduction, is stored as an intermediate image signal 1b. Also, an image signal, which is obtained from the picture element density conversion, is stored as an intermediate image signal 1c. In order for the effects of the storing of the intermediate image signals to be clarified, problems of the conventional radiation image processing system will be described hereinbelow.

Specifically, it often occurs that the image represented by the image signal, which has been stored ultimately, or the image reproduced on photographic film is an abnormal image having bad image quality. For example, an abnormal image is often obtained, in which a lower half image portion is black and details of the image information in the lower half image portion are imperceptible. It is considered that such problems occur in two cases described below. In the first cases, the problems occur due to abnormality, which can be detected by the radiation image processing system. For example, the problems occur when the value of a variable, which should take a positive value, takes a negative value as a result of the processing. In such cases, ordinarily, the radiation image processing system notifies the operator of an error or warning. Therefore, at least a portion, at which abnormality occurred, can be specified. However, sufficient information cannot necessarily be obtained from the error information, and a cause of the abnormality cannot be specified easily.

In the second cases, the aforesaid problems occur due to an abnormality, which cannot be detected by the radiation image processing system. For example, the problems occur when the operator inputted an incorrect parameter value by mistake without knowing it, and the inputted parameter value fell within a normal range that can be recognized by the radiation image processing system. In such cases, the radiation image processing system does not notify the operator of an error or warning. Therefore, a portion, at which an abnormality occurred, cannot be specified unless the operator pursues all of the processes. If the number of the processes to be pursued is large, and if the processing carried out in each process is complicated processing, considerable time and labor will be required to specify a portion, at which the abnormality occurred. In a radiation image processing system, wherein complicated image processing is carried out over many processes, considerable time and labor were required to pursue all of the processes, and it was difficult to specify a portion, at which an abnormality occurred.

However, with the first radiation image processing method and apparatus in accordance with the present invention, the intermediate image signals 1a, 1b, and 1c, which are obtained in the respective processes, are stored. Therefore, in cases where an abnormality occurred, an investigation can be made as to whether each of the intermediate image signals 1a, 1b, and 1c is or is not normal, and a portion, at which an abnormality occurred, can be specified easily. Also, a cause of the abnormality can be specified easily by investigating an abnormal intermediate image signal in detail. For example, as illustrated in FIG. 1, in cases where an abnormality occurred in the process for sub-scanning reduction, only the intermediate image signal 1a is normal, and the intermediate image signals 1b and 1c are abnormal image signals, which are different from the intermediate image signals that are to be obtained from the process for sub-scanning reduction and the process for picture element density conversion. Therefore, it can be found that an abnormality occurred in the process for sub-scanning reduction. Also, a cause of the abnormality can be specified by investigating the intermediate image signal $1b$ in detail.

Each of the intermediate image signals is stored on a storage medium, such as a hard disk or a memory. In general, an image signal is made up of a large amount of information, and a large storage capacity is required to store the image signal. Therefore, in a radiation image processing system in which many radiation images are processed successively, it is not necessarily desirable that all of the intermediate image signals are stored. Accordingly, in this embodiment, a storage area capable of storing at least three image signals, i.e. the intermediate image signals $1a$, $1b$, and $1c$. When the processing of a single radiation image has been finished, intermediate image signals obtained with respect to the next radiation image are unconditionally overwritten on the same storage area. In this manner, in normal cases, the intermediate image signals, which became unnecessary, are not kept stored. Only in cases where an instruction has been given by the operator, or only in cases where the radiation image processing system has detected an error or a condition to be warned, the intermediate image signals are retained. For such purposes, the overwriting on the storage area may be ceased, and the storing of intermediate image signals, which are obtained in the next process and those that follow, may be carried out on a different storage area. Alternatively, the processing may be interrupted, the intermediate image signals having been stored may be saved to a different storage area, and the processing may then be begun again. In this manner, the storage area can be utilized efficiently. As a result, the objects of the present invention can be accomplished without a storage medium, such as a hard disk or a memory, being used wastefully.

The way, in which a storage area is prepared, is not limited to the example described above. For example, a storage capacity for storing the intermediate image signals obtained with respect to several radiation images may be prepared. Also, the amount of information constituting the intermediate image signals varies for different radiation images. Therefore, the designer or the operator of the radiation image processing system should preferably determine an appropriate storage capacity by considering the kinds of the radiation images, which are processed in the radiation image processing system.

In the second radiation image processing method and apparatus in accordance with the present invention, as in the first radiation image processing method and apparatus in accordance with the present invention, the storing of an intermediate image signal is carried out. However, in the second radiation image processing method and apparatus in accordance with the present invention, the intermediate image signal is stored only in cases where the radiation image processing system has detected an error or a condition to be warned. In this manner, the storage capacity required is kept as small as possible. FIG. 2 shows the concept behind the second radiation image processing method and apparatus in accordance with the present invention. As illustrated in FIG. 2, in the second radiation image processing method and apparatus in accordance with the present invention, a judgment is made as to whether or not an abnormality occurred in each process. In cases where it has been judged that an abnormality occurred in a process, the intermediate image signal having been obtained in the abnormal process is stored. In cases where a process has been finished normally, the storing of the intermediate image signal having been obtained in the process is not carried out. At the time at which an abnormality occurred, the processing may be ceased immediately. In cases where a warning has been issued, after the intermediate image signal is stored, the next process may be carried out. In such cases, the presence or absence of the intermediate image signal represents the portion, at which an abnormality occurred. Also, as in the first radiation image processing method and apparatus in accordance with the present invention, a cause of the abnormality can be specified by investigating the intermediate image signal in detail.

As described above, with the radiation image processing methods and apparatuses in accordance with the present invention, the burden to the operator at the time of the occurrence of the abnormality can be kept markedly small.

What is claimed is:

1. A radiation image processing method for carrying out image processing, comprising a plurality of processes, on a radiation image signal, said method comprising the steps of:

generating an individual intermediate image signal after each of the plurality of processes other than a last process in said image processing, before a normalization process has been performed, such that a plurality of intermediate signals are generated;

storing, automatically, until said image processing is complete, each of said individual intermediate image signals obtained in said plurality of processes, on a predetermined storage medium, such that each of said stored individual intermediate image signals represents a respective process and such that said individual intermediate image signals stored on said predetermined storage medium are not directly used with other individual intermediate image signals to form a reproduced radiation image;

determining whether an abnormality has occurred during said image processing, said determining being performed after said image processing has been completed, and utilizing each of said stored intermediate image signals, wherein each of said stored individual intermediate image signals is indicative of a normal or abnormal image signal, and wherein any of said stored intermediate image signals which exhibit said abnormality after checking, indicates where an abnormality occurred in said plurality of processes of said image processing.

2. The radiation image processing method according to claim 1, further comprising the step of repeatedly overwriting intermediate image signals obtained from other image processings, on a predetermined first storage area of said storage medium where said intermediate image signals are stored.

3. The radiation image processing method of claim 2, further comprising the step of ceasing the overwriting on said first predetermined storage area and retaining one of said stored intermediate image signals indicating said abnormality in one of said plurality of processes, in accordance with an instruction, which is given by one of an operator, and a signal, which represents the occurrence of an abnormality in a preceding process.

4. The radiation image processing method of claim 2, further comprising the step of storing said intermediate image signals in a second storage area of said storage medium upon a signal by an operator indicating said abnormality in said image processing.

5. The radiation image processing method of claim 1, further comprising the step of interrupting said image processing when said abnormality in said image processing occurs.

6. The radiation image processing method of claim 1, further comprising the step of interrupting said image processing when said abnormality in said image processing occurs, and storing said intermediate signal indicating an abnormality in a second storage area, and restarting image processing.

7. A radiation image processing apparatus, comprising:

a plurality of image processing means for successively carrying out different processes during image processing on a radiation image signal;

intermediate image signal generation means for generating an individual intermediate image signal after each of said different processes, other than a last image process, before a normalization process has been performed, such that a plurality of intermediate image signals are generated;

storage means having a plurality of storage areas, for automatically storing, until said image processing is complete, each of said individual intermediate image signals, such that each of said stored individual intermediate image signals represents a respective process, and such that each of said stored individual image signals is not directly used with other individual intermediate image signals to form a reproduced radiation image; and abnormal intermediate image signal checking means for determining after said image processing, that an abnormality has occurred during said image processing, wherein each of said stored individual intermediate image signals is indicative of a normal or abnormal image signal, wherein any of said stored individual intermediate image signals which exhibit an abnormality after being checked by said checking means, indicates where an abnormality occurred in said processes.

* * * * *